US012391002B2

(12) United States Patent
Gonzalez Martin et al.

(10) Patent No.: US 12,391,002 B2
(45) Date of Patent: Aug. 19, 2025

(54) GEOMETRICAL COMPENSATION MODELS

(71) Applicant: Peridot Print LLC, Palo Alto, CA (US)

(72) Inventors: Sergio Gonzalez Martin, Sant Cugat del Valles (ES); Manuel Freire Garcia, Sant Cugat del Valles (ES); Victor Diego Gutierrez, Sant Cugat del Valles (ES)

(73) Assignee: Peridot Print LLC, Palo Alo (CA)

( * ) Notice: Subject to any disclaimer, the term of this patent is extended or adjusted under 35 U.S.C. 154(b) by 497 days.

(21) Appl. No.: 17/757,789

(22) PCT Filed: Jan. 22, 2020

(86) PCT No.: PCT/US2020/014537
§ 371 (c)(1),
(2) Date: Jun. 21, 2022

(87) PCT Pub. No.: WO2021/150215
PCT Pub. Date: Jul. 29, 2021

(65) Prior Publication Data
US 2023/0024633 A1    Jan. 26, 2023

(51) Int. Cl.
*B29C 64/386* (2017.01)
*B33Y 50/02* (2015.01)
*G05B 19/4099* (2006.01)

(52) U.S. Cl.
CPC ............ *B29C 64/386* (2017.08); *B33Y 50/02* (2014.12); *G05B 19/4099* (2013.01)

(58) Field of Classification Search
CPC ..... B29C 64/386; B29C 64/393; B33Y 50/02; G05B 19/4099

(Continued)

(56) References Cited

U.S. PATENT DOCUMENTS 9,886,526 B2    2/2018   Huang
10,474,134 B2   11/2019  Huang et al.
(Continued)

FOREIGN PATENT DOCUMENTS

WO    2018/064349 A1    4/2018

OTHER PUBLICATIONS

"HP 3D Process Control," Users Guide, HP Development Company, L. P., retrieved at http://h10032.www1.hp.com/ctg/Manual/c06452549.pdf, retrieved on 2019, 29 pages.

*Primary Examiner* — Chun Cao
*Assistant Examiner* — Michael Tang
(74) *Attorney, Agent, or Firm* — Michael Dryja (57) ABSTRACT

In an example, a method includes acquiring, by a processor and for a set of locations in a fabrication chamber for additive manufacturing, data identifying a first subset of locations associated with a first level of variability in deformations in object generation and a second subset of locations associated with a second, greater, level of variability in deformations object generation. A geometrical compensation model may be derived to compensate for anticipated deformations in object generation by a first additive manufacturing apparatus. The geometrical compensation model may comprise geometrical transformations to apply to object model data representing at least a portion of an object, wherein each geometrical transformation is associated with a location of the set of locations. The first subset of locations may be associated with geometrical transformations determined based objects generated by a plurality of additive manufacturing apparatus and the second subset of locations may be associated with geometrical transformations determined based on objects generated by the first additive manufacturing apparatus.

7 Claims, 4 Drawing Sheets

(58) Field of Classification Search
USPC .......................................................... 700/97
See application file for complete search history.

(56) References Cited

U.S. PATENT DOCUMENTS

| | | | |
|---|---|---|---|
| 2014/0107823 A1 | 4/2014 | Huang | |
| 2015/0352794 A1* | 12/2015 | Nguyen | B22F 10/25 |
| | | | 700/98 |
| 2016/0354980 A1* | 12/2016 | Ho | B29C 64/40 |
| 2017/0203517 A1* | 7/2017 | Crear | B23K 26/082 |
| 2017/0368753 A1 | 12/2017 | Yang et al. | |
| 2018/0095450 A1 | 4/2018 | Lappas et al. | |
| 2019/0009472 A1* | 1/2019 | Mark | B29C 64/393 |
| 2019/0054700 A1* | 2/2019 | Chandar | G06F 17/18 |
| 2019/0099951 A1 | 4/2019 | Zhang et al. | |
| 2019/0134914 A1 | 5/2019 | Gonzalez et al. | |
| 2021/0299753 A1* | 9/2021 | Hartmann | B33Y 50/02 |

\* cited by examiner

GEOMETRICAL COMPENSATION MODELS

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which:

FIG. 4 shows an example method of deriving geometrical transformations; in

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved using heat, for example through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In examples, such a fusing agent may comprise any or any combination of an infra-red light absorber, a near infra-red light absorber, a visible light absorber and a UV light absorber. Examples of print agents comprising visible light absorption enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed, and may for example act to cool the build material to which it is applied, or otherwise to reduce or prevent coalescence thereof. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to derive slices of parallel planes of the model. Each slice may define a portion of a respective layer of build material that is to be solidified or caused to coalesce by the additive manufacturing system.

Figure 1:
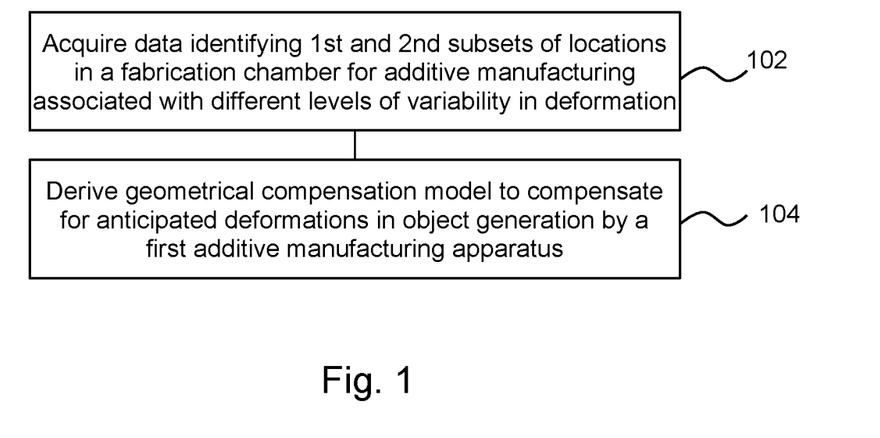
FIG. 1 shows an example method of deriving a geometrical compensation model.

FIG. 1 is an example of a method, which may comprise a computer implemented method of deriving a geometrical compensation model for use in additive manufacturing, wherein the model is derived or adapted for a particular object generation apparatus.

Geometrical transformations may be used to modify object model data, for example to apply a geometrical compensation in order to compensate for anticipated departures from intended dimensions when generating an object. The transformation to apply may be provided by use of a geometrical compensation model, which may specify a value of at least one geometrical transformation parameter.

For example, it may be the case that, in some print apparatus, when an object is generated in a process which includes heat, additional build material may adhere to the object on generation. In one example, fusing agent may be associated with a region of the layer which is intended to fuse. However, when energy is supplied, build material of neighbouring regions may become heated and fuse to the outside of the object (in some examples, being fully or partially melted, or adhering to melted build material as powder). Therefore, a dimension of an object may be larger than the region(s) to which fusing agent is applied. In order to compensate for this effect, i.e. where it is anticipated that an object may tend to 'grow' during manufacture in this (or some other) manner, the object volume as described in object model data may be reduced to compensate for such growth. The reduction of the volume may be defined in a geometrical compensation (or geometrical transformation) model as at least one geometrical compensation parameter value.

In other examples, objects may be smaller following object generation than is specified in object model data. For example, some build materials used to generate objects may shrink on cooling. Therefore, a geometrical transformation model may specify at least one geometrical transformation parameter value to in turn specify how an object volume in object model data should be increased to compensate for the anticipated reduction in volume.

A particular object may be subject to mechanisms which result in growth and/or shrinkage, and the actual compensation to be applied may be determined by consideration of, or may be influenced by, the different degrees to which an object may be affected by such processes.

In some examples, a modification may be specified using a geometrical transformation parameter(s) comprising a scaling and/or an offset (for example, specified as a scaling factor and/or an offset value). A scaling factor may be used to multiply all specified dimensions in the direction of at least one axis by a value, which may be greater than 1 in order to increase the dimension(s) and less than 1 to reduce the dimension(s). An offset value may specify, for example by a specified distance or a number of defined sub volumes or 'voxels' (i.e. three-dimensional pixels), an amount to add or remove from a surface of the object (or a perimeter within a layer). For example, a distance from the object surface may be specified and the object may be eroded or dilated (i.e., inflated or enlarged) by this distance.

Geometrical compensations may in general be determined based on a theoretical analysis of object generation, for example considering the predicted temperatures and/or material behaviour characteristics. In some examples, geometrical compensation models may for example be derived based on test objects, which may be generated (i.e. manufactured or 'printed') and measured to characterise the deformations. Techniques such as data fitting or regression may be used to determine the scaling factor and/or offset to apply. For example, where previously generated objects have tended to be smaller than expected in a particular dimension, there may be a scaling factor of greater than 1 and/or a positive offset derived and where previously generated objects have tended to be larger than expected in a particular dimension, there may be a scaling factor of less than 1 and/or a negative offset derived. In some examples, geometrical compensation models/geometrical transformations may be derived using machine learning techniques based on deviations from expected dimensions in previously generated objects.

One example of a geometrical compensation model may comprise one or a set of scaling and/or offset parameters associated with a particular object generation apparatus, or type of object generation apparatus. The parameters may be applied to all objects in the same way (for example, regardless of the object size and/or placement).

In other examples, a geometrical compensation model may allow a geometrical compensation derived or selected therefrom to be tailored to an intended object generation operation and/or object.

In particular, in examples herein, a geometrical compensation model takes account of an intended location of an object in a fabrication chamber of an additive manufacturing apparatus. It has been noted that dimensional deformation may be related to the location of object generation within a chamber, and therefore different compensations may be applied for different object locations to improve accuracy.

Such geometrical compensation models may therefore comprise or provide transformations which may be mapped to the intended location of an object (which may for example be a single identifiable point such as the location of the centre of mass of the object, or may include a consideration of the volumetric extent of the object).

For example, if an object is to be generated at a first location within the fabrication chamber, the location may be mapped to a geometrical transformation comprising one or more offset and/or scaling values which are intended to compensate for anticipated deviations from intended dimensions. However, if the same object were to be generated at a second location within the fabrication chamber, this second location may be mapped to a different geometrical transformation comprising one or more different offset and/or scaling values. Thus, the particular geometrical transformation applied may vary between different locations, and may be based on predetermined mappings or the like.

In examples therefore, a geometrical compensation model may comprise a plurality of defined geometrical transformation parameters (or parameter sets), each associated with different locations within the fabrication chamber. In such examples, a particular geometrical transformation parameter(s) and/or value(s) may be selected based on the intended object generation location. In some examples, defined locations or 'nodes' may be associated with geometrical transformation parameter(s)/value(s), and the geometrical transformation parameter(s)/value(s) to apply at locations intermediate to such defined locations may be derived for example by interpolation, or by selection of the closest defined location, or the like. The 'nodes' may for example be associated with locations distributed to form intersections of a grid within the fabrication chamber such that they are dispersed (for example, regularly) throughout the chamber. The model may be embodied as a look-up table or other mapping resource, mapping the locations to parameter values to be applied to the object models of objects to be generated at the location.

In some examples, other characteristics of the object, such as consideration of the object volume and/or surface area, may be used as input parameters in a geometrical compensation model, and may be mapped to different geometrical transformation values.

For example, bulkier objects (i.e. objects having a larger volume) may accrue greater thermal energy than smaller objects, and may therefore tend to accumulate more heat than smaller objects. Cooling such objects may therefore take more time than cooling less bulky objects. This may lead to different deformations. The surface area (and combinations of the volume and surface area) may be used to determine how 'solid' an object is. The amount of solid material in an object may be used to predict how the object may deform. For example, a more solid object may tend to accumulate more heat than a less solid object in a thermal fusing additive manufacturing operation. Such object generation parameters may therefore be mapped to different geometrical transformations within a geometrical compensation model.

Some geometrical compensation models may for example include a consideration of how many objects are to be generated in a fabrication chamber and/or the proximity of the objects (for example in terms of 'packing density').

In some examples, other object generation parameter values (which may be object generation parameter values which are configurable or selectable by a user or operator) may also be considered. The object generation parameter(s) may be any parameter which may have an impact on dimensional inaccuracy. For example, the object generation parameter(s) may comprise any, or any combination of, environmental conditions, object generation apparatus, object generation material composition (which may comprise selection of the type or composition of build material and/or print agents), object cooling profile, print mode, or the like. These may be specified, for example, by input to at least one processor. Thus, different geometrical compensation models and/or different parameters may be provided for different apparatus, different print modes, different cooling profiles or the like.

The geometrical transformation parameter value(s) and/or geometrical compensation model(s) specifying such parameters may for example be stored in a memory, for example embodied as a mapping resource(s) such as lookup tables and the like, or may be embodied as one or more algorithm, for example relating object generation parameter(s) (e.g. object generation location and in some examples any or any combination of volume, surface area, packing density, environmental conditions, object generation apparatus, object generation material composition, object cooling profile or print mode or the like) to a compensation to be applied to object model data.

The method of FIG. 1 comprises, in block 102, acquiring, by a processor and for a set of locations in a fabrication chamber for additive manufacturing, data identifying a first subset of locations associated with a first level of variability in deformations in object generation and a second subset of locations associated with a second level of variability in deformations object generation, wherein the second level is greater than the first level. The data may for example be acquired from a memory, or over a network, determined by analysis of other data (for example, data generated by measuring objects generated by a number of different additive manufacturing apparatus) or the like. Each subset may comprise one or more location. In some examples, the acquiring the data may comprise receiving the data over a network or retrieving the data from a memory. In some examples, acquiring the data may comprises performing measurements.

As mentioned above, the location of object generation within a fabrication chamber may have an impact on object deformation. Therefore, compensation models which associate object generation location with one or more compensation parameters may be developed. Generating such models may comprise determining an 'average' compensation to apply over a plurality of build operations, which may be performed using a plurality of additive manufacturing operations. The 'average' may in practice be derived as mentioned above using regression/data fitting, and may represent a 'best fit' for previously manufactured and measured objects.

A geometrical compensation model may comprise one or a plurality of predefined geometrical transformations, and/or may comprise information used to derive geometrical transformation(s) to apply to object model data describing an object. In some examples, in addition to location, the model may be associated with expected input parameter(s) (such as object volume, object surface area, build material, object generation parameters and the like) which are to be provided to determine geometrical transformation(s) to apply to an object. For example, there may be a mapping between such input parameter(s) and geometrical transformation(s).

In order to characterise the deformations of a particular additive manufacturing apparatus, one option may be to generate at least one set of calibration objects distributed through the volume of a fabrication chamber. The calibration objects of such a 'calibration batch' may be measured and the measurements used in determining or tailoring a compensation model to that apparatus. This can result in a well-designed model, which is likely to result in the generation of objects with accurate dimensions. However, in practice, to provide a good model, several batches of calibration objects may be generated, and each batch takes time and utilises resources such as build material and print agents, increasing costs. Measurements of the objects themselves may be time consuming, for example being a manual process or performed by specialist equipment.

However, the inventors have realised that locations within fabrication chambers may be associated with a level of variability in deformations. For example, for a first location within the fabrication, the deformations measured over a number of different fabrication operations (which may be in the same apparatus or multiple different apparatus) may be relatively consistent—there may be little spread in the data collected for objects generated in such locations. This consistency would therefore also be seen for the scaling and offset factors generated based on each build operation. A measure of the spread, for example the standard deviation of the data characterising deformations and/or the transformation values, may be relatively low. However, in a second location, the data may be more variable—expressed another way, the level of variation, for example as characterised by the standard deviation, may be higher.

Block 104 comprises deriving, by a processor (which may comprise the same processor as used in block 102), a geometrical compensation model to compensate for anticipated deformations in object generation by a first additive manufacturing apparatus. The geometrical compensation model comprises geometrical transformations to apply to object model data representing at least a portion of an object to be generated by the additive manufacturing apparatus, wherein each geometrical transformation is associated with a location of the set of locations. In this example, the first subset of locations (i.e. those with a lower level of variability) are associated with geometrical transformations determined based on indications of deviations between intended object dimensions and generated object dimensions of objects generated by a plurality of additive manufacturing apparatus, and the second subset of locations (i.e. those with a higher level of variability) are associated with geometrical transformations determined based on indications of deviations between intended object dimensions and generated object dimensions of objects generated by the first additive manufacturing apparatus.

In other words, the geometrical compensation model for the first additive manufacturing apparatus may comprise two data sources. For the first subset of locations (those locations which are associated with more consistent deformations), 'generic' geometrical transformation parameter values may be used. The data for characterising geometrical modifications to apply to object model data may comprise a data set based on indications of deviations between intended object dimensions and generated object dimensions for objects generated by a plurality of additive manufacturing apparatus (i.e. data from which a 'generic' geometrical compensation model may be generated).

However, for the second subset of locations—those associated with higher variability in deformation-'specific' geometrical transformation parameter values may be used, i.e. those derived from generating objects using the first additive manufacturing apparatus itself.

By identifying the data with a higher level of variability in deformation, the parameters which are most likely to differ between different instances of additive manufacturing apparatus may also be identified. In turn, this means that the tasks of generating calibration objects using the first additive manufacturing apparatus and measuring such objects may be reduced in scope as calibration objects may be generated by the first additive manufacturing apparatus in at least one of those location(s) with relatively high variability and not in location(s) with relatively low variability.

The first and second levels of variability may for example be determined based on a threshold, which may for example be set considering a balance between the level of tailoring of a 'generic' model, and the generation of specific data for the first additive manufacturing operation. While tailoring the data for a higher number of locations will increase the accuracy of objects generated using the model by the first additive manufacturing apparatus, generating the data consumes both time and resources. The balance may be predetermined, for example selected based on an intended manufacturing tolerance or may be user selected or the like.

Thus, the method of FIG. 1 allows a generic compensation model to be tailored intelligently by targeting the location(s) associated with a high level of variability, or a lower level of certainty of suitability to any given additive manufacturing apparatus, for (resource and time consuming) generation of data specific to the first additive manufacturing apparatus.

Block 104 may for example comprise replacing transformation parameters of a generic compensation model with transformation parameters generated from data acquired from objects generated by the first additive manufacturing apparatus In some examples, the geometrical compensation model may have any of the characteristics of the geometrical compensation models described above and may characterise one or more geometrical transformation to be applied to object model data. Such geometrical transformations may comprise at least one of an offset and a scaling factor. For example, a geometrical transformation may be specified as scaling and/or offset components in an X and Y axis (for example to be applied in a single slice of an object), or as scaling and/or offset components in an X, Y and Z axis.

In some examples, a geometrical transformation may be defined using two or three scaling factors (one for each of two/three axes, which may be orthogonal) and/or two or three offset values (one for each of two/three axes, which may be orthogonal). If scaling is not indicated in a given axis, the scaling factor in relation to that axis may be set to 1, and if no offset is indicated in a given axis, the offset value in relation to that axis may be set to 0.

Taking an example in which a scaling factor is specified in each of three orthogonal axes, this may in some examples be specified as a vector having components in the X, Y and Z directions, and may for example be specified as [SFx, SFy, SFz]. This may, for example, taking the object in its intended generation orientation, mean that the 'width' of the object is to be scaled by SFx, the 'depth' of the object is to be scaled by SFy, and the 'height' of the object is to be scaled by SFz (noting that, in practice, the object may be generated in any orientation, and therefore the height of the object during generation may not correspond to the height of the object as orientated for use thereof following generation). Similarly, the offset for a given location may be specified as [Ox, Oy, Oz]

Figure 2A:
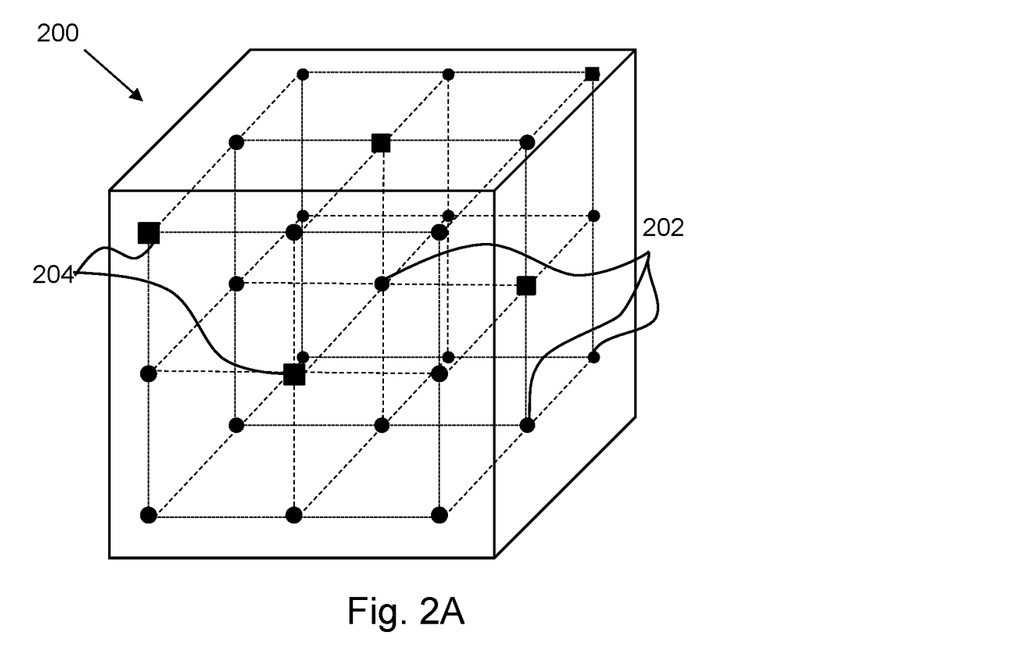
FIG. 2A shows locations within a fabrication chamber and FIGS. 2B and 2C show scaling and offset transformations derived for two of the locations.

FIG. 2A shows an example of a fabrication chamber 200 which has a plurality of defined locations, or nodes 202, 204 (a subset of which is labelled to avoid complicating the Figure). In this example, the nodes are distributed in a regular pattern although this need not be the case in all examples. There are two types of nodes, indicated by their respective different shapes. A first type of node 202 is indicated as a circle, and indicates locations associated with a first level of variability in deformations in object generation. The second type of node 204 is indicated as a square, and is associated with a second subset of locations associated with a second, greater, level of variability in deformations object generation.

Each of the nodes 202, 204 may be associated with a scaling and/or offset parameter for objects generated at that location. Generation at that location may mean that the object has a centre of mass at that location, and compensation parameters for objects to be generated with a centre of mass between the nodes 202, 204 may for example be those of the closest node, or generated from one or more of the nodes near to the location. However, in principle, any identifiable point on the object may be used to define its location.

In this example, the number of nodes shown is relatively small to avoid overcomplicating the Figures. However, in practice, there may be precomputed geometrical compensation values for many more, or example around 2000-5000 positions in an example fabrication chamber having a size of around 380 mm×284 mm×380 mm, and the values for intermediate locations may be interpolated from these values. While calibration objects may be generated or 'printed' at each node, and therefore be used to derive data for that node, this may not be the case in practice. In some example, the number of calibration objects, even in a full calibration batch (i.e. a build operation which includes calibration objects and no production objects), the number of objects may be in the low hundreds (for example 100-150), and the precomputed node values may be determined using, for example, linear and/or non-linear interpolations (which may be based on previously derived patterns, for example using machine learning and the like).

Figure 2B:
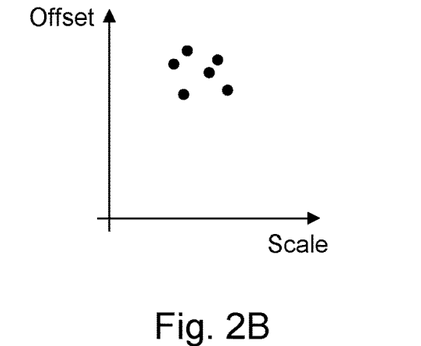
Figure 2C:
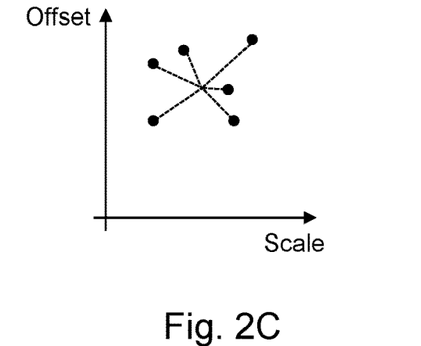

FIGS. 2B and 2C respectively show an example of scale and offset parameters which has been determined for each of a plurality of objects generated in a location of a node of the first type 202 (FIG. 2B), and for objects generated in a location of a node of the second type (FIG. 2C), using the same arbitrary scale. Each dot indicates a scaling factor and offset value derived as a result of generating an instance of an object on a particular apparatus, such that each dot relates to a different additive manufacturing apparatus. As can be seen, the dots in FIG. 2B are more concentrated than those shown in FIG. 2C.

FIG. 2C also shows dotted lines leading to a 'centre of gravity' of the plot. In some examples, the length of these lines may be used to calculate a variability parameter. For example, a variability parameter may be calculated as:

$$\sqrt{\frac{\sum_{i=1}^{n}(\overline{o}-o_i)^2 + (\overline{s}-s_i)^2}{n-1}}$$

where $s_i$ and $o_i$ are each value of scale and offset of the part in each additive manufacturing apparatus i of a set of n such apparatus, and $\overline{s}$ and $\overline{o}$ are the respective average values of scale and offset.

Figure 3:
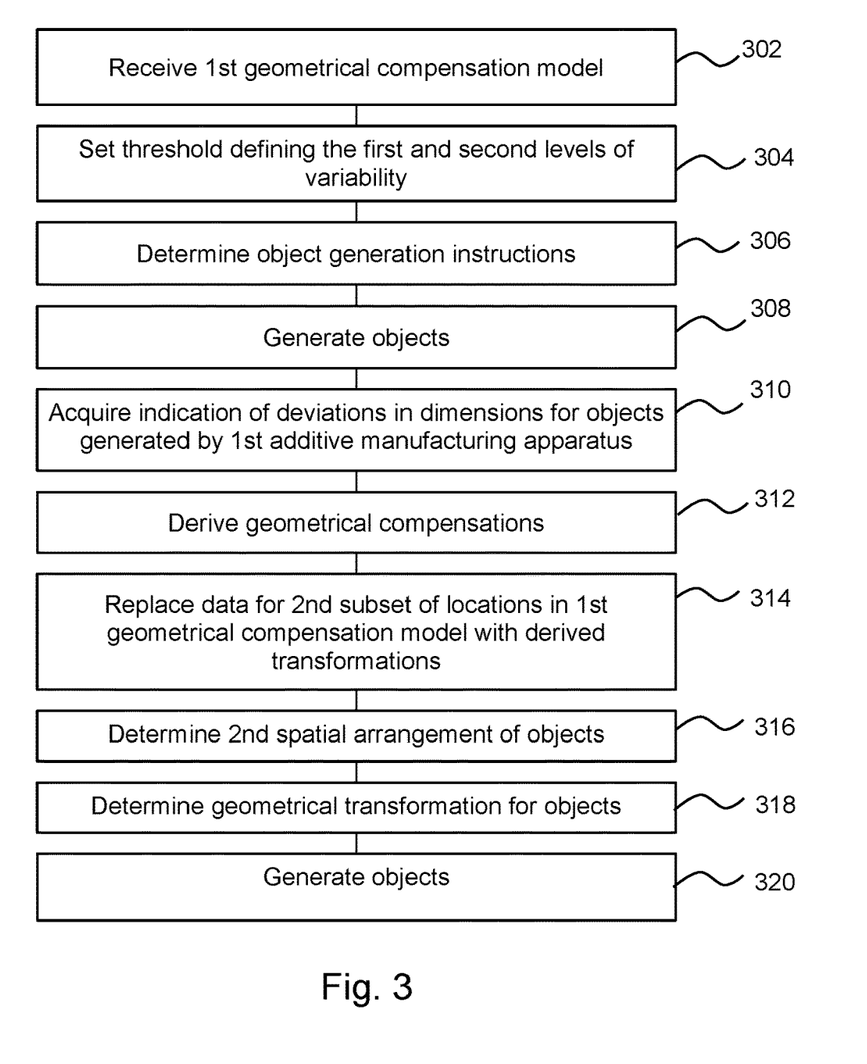
FIG. 3 shows another example method of deriving a geometrical compensation models and generating objects.

FIG. 3 is an example of a method of determining a geometrical compensation model, which may be a geometrical compensation model as described in relation to FIG. 1.

Block 302 comprises receiving a first geometrical compensation model including geometrical transformations for the set of locations. In other words, the first geometrical compensation model is a 'generic' geometrical compensation model. In this example, each location is associated with a variability parameter derived from measurements of deformations of objects generated by the plurality of additive manufacturing apparatus. In some examples, determining the variability parameter for each location may comprise determining a measure of standard deviation. The variability parameter may for example be a deviation in the parameters derived for each of a plurality apparatus (as set out in the equation above), or may comprise variability in deformation data directly (i.e. the deviations from expected dimensions of the object).

Block 304 comprises setting a threshold defining the first and second levels of variability. For example, for location(s) where the standard deviation is above a threshold, these may be designated as having the second level of variability and therefore belonging to the second subset whereas if the standard deviation is below a threshold, these locations may be designated as having the first level of variability and therefore belonging to the first subset of locations. The threshold may for example be set based on an intended accuracy for object generation. If a high level of accuracy is intended, then the threshold may be set lower than if a lower level of accuracy is acceptable.

Block 306 comprises determining object generation instructions for generating objects in at least some of the second subset of locations. For example, this may comprise generating additive manufacturing instructions for a batch of objects, some of which may be objects which it is intended to be used or sold (referred to as 'production' objects herein), whereas other objects may be intended to be used as calibration objects, and such calibration objects may be generated in the second subset of locations. While in principle any object could provide an indication of deviations from anticipated dimensions, in some examples, calibration objects may have features which renders them suitable for such use, for example having well defined measurement points and/or relative dimensions. The inclusion of calibration objects may reduce the space available for production objects, but these may nevertheless be generated alongside the calibration objects.

In some examples, the data models of the production object(s) may have transformations applied thereto based on their location and compensation parameters derived from the first geometrical compensation model. In some examples, the calibration object(s) may also have transformations applied thereto based on their location and compensation parameters derived from the first geometrical compensation model, although in other example no such compensations may be applied.

Block 308 comprises generating the objects by the first additive manufacturing apparatus (which may comprise calibration objects at at least some of the second subset of locations and production objects elsewhere).

Methods of object generation may comprise determining object generation instructions (or 'print instructions') for generating the object. The object generation instructions in some examples may specify an amount of print agent to be applied to each of a plurality of locations on a layer of build material. For example, deriving object generation instructions may comprise determining 'slices' of a virtual build volume comprising virtual object(s) (to which a modification may have been applied) and rasterising these slices into pixels (or voxels, i.e. three-dimensional pixels). An amount of print agent (or no print agent) may be associated with each of the pixels/voxels. For example, if a pixel relates to a region of a build volume which is intended to solidify, the object generation instructions may be derived to specify that fusing agent should be applied to a corresponding region of build material in object generation. If however a pixel relates to a region of the build volume which is intended to remain unsolidified, then object generation instructions may be derived to specify that no agent, or a coalescence modifying agent such as a detailing agent, may be applied thereto, for example to cool the build material. In addition, the amounts of such agents may be specified in the derived instructions and these amounts may be determined based on, for example, thermal considerations and the like. In other examples, object generation instructions may specify how to direct directed energy, or how to place a curing or binding agent or the like.

Generating an object may comprise generating the object based on object generation instructions (or 'print instructions'). For example, such an object may be generated layer by layer. For example, this may comprise forming a layer of build material, applying print agents, for example through use of 'inkjet' liquid distribution technologies in locations specified in the object generation instructions for an object model slice corresponding to that layer using at least one print agent applicator, and applying energy, for example heat, to the layer. Some techniques allow for accurate placement of print agent on a build material, for example by using print heads operated according to inkjet principles of two-dimensional printing to apply print agents, which in some examples may be controlled to apply print agents with a resolution of around 600 dpi, or 1200 dpi. A further layer of build material may then be formed and the process repeated, for example with the object generation instructions for the next slice. In other examples, objects may be generated using directed energy, or through use of chemical binding or curing, or in some other way.

Block 310 comprises acquiring an indication of deviations between intended object dimensions and generated object dimensions for objects generated by the first additive manufacturing apparatus. For example, this may comprise measuring a plurality of dimensions of at least one generated object, and/or receiving such measurements at a processor. In some examples, there may be tens or hundreds such data points acquired. In some examples, the measurements and/or the deviations may be determined remotely and transmitted to the at least one processor, for example over a network or the like. Measurements of dimensions may for example be acquired using at least one of 3D scanning, other optical measurement techniques and/or using manual measurements.

As noted above, in some examples, the indication of deviations between intended object dimensions and generated object dimensions for objects which are generated by the first additive manufacturing apparatus applying a geometrical compensation model (which may be the first geometrical compensation model) to model data. In other words, the object model data used to generate the object(s) from which measurements have been acquired may have itself been modified by a compensation model, and may be used to derive a new or modified compensation model. In other examples, the objects may be generated based on object model data which has not been modified using compensation parameters.

The data may be gathered from objects generated in one or more build operations carried out using the first additive manufacturing apparatus. In some examples, a single build operation may provide sufficient data to allow adaptation of a compensation model. The calibration objects may comprise multiple instances of objects of a common design, and/or may comprise objects of more than one design.

In some examples, the processor(s) providing the method may for example have an awareness of an expected data set. For example, the objects to be printed by the first additive manufacturing apparatus may be predetermined, for example comprising a predetermined calibration set of objects. In some examples, deviations may be scaled by anticipated measurements. In some examples, the method may comprise validating this data. For example, data which indicates a large deviation may be due to a malfunction, noise introduced in the measurement process or the like. In such cases, it may be preferred to reject that data point (or indeed in some examples, to request a new data set entirely) to avoid deriving a new model based on data which is unlikely to be characteristic of that additive manufacturing apparatus. In some examples, an acceptable data range (or the threshold for determining what constitutes a 'large' deviation) may be derived in the context of the data set. For example, a single large deviation in a data set which is otherwise indicative of relatively small deviations may be rejected, but a similarly large deviation in a data set in which large deviations are relatively common may be maintained. This may allow a trend to be distinguished from, for example, a measurement anomaly. In other examples abnormal measurements (which may lead to abnormal (for example large) estimations of scale/offset) may be evaluated in relation to individual measurements. In some examples, if the data is incomplete (for example, at least a threshold number of expected measurements is missing or rejected), the data set may be rejected.

Block 312 comprises deriving the geometrical transformations to be associated with the second subset of locations based on the received indications of deviations. This may comprise, for example, determining the scaling and offset which would have resulted (on average) in the generated objects having their intended dimension, for example using regression based data fitting techniques. If the object models for the calibration objects were modified using a compensation model prior to object generation, then this may be taken into account when deriving the geometrical transformations.

Block 314 comprises replacing the data for at least a portion of the second subset of locations in the first geometrical compensation model with the transformations derived in block 312. This may result in a modified compensation model, which comprises a mix of 'generic' geometrical transformation values and 'specific' geometrical transformation values (i.e. specific to the first additive manufacturing apparatus). As noted above, if the object models for the calibration objects were modified using a compensation model prior to object generation, then this may be taken into account when deriving the geometrical transformations. However, in some examples, the generic data may, instead of being replaced, be combined with the transformations derived in block 312 to generate modified data for the second subset of locations.

In some examples, rather than replacing geometrical transformations, the indication of deviations derived in block 310 may be used as part of a data set which includes 'generic' data—i.e. indications of deviations derived from a plurality of additive manufacturing apparatus—for the first subset of locations. In such examples, the indication of deviations derived in block 310 may be combined with that data set which may be used to derive the first geometrical compensation model, rather than being used to adapt an existing geometrical compensation model.

This method may therefore generate apparatus-specific 'corrections' to the first geometrical compensation model. The 'corrections' may be derived to compensate for the deviations from the expected measurements which are different to those compensated for by the first geometrical compensation model. Such 'corrections' may be embodied as offset value(s) and/or scaling factor(s), which in some examples may be added or combined with offset value(s) and/or scaling factor(s) set out in the first geometrical compensation model. In other examples, a method may be may generate a geometrical compensation model from a mix of generic data for some locations and specific data for other locations In some examples, the apparatus-specific geometrical compensation model may be derived remotely from the additive manufacturing apparatus for which the model has been tailored, and transmitted thereto, for example over a network or the like. A particular general geometrical compensation model or data set maybe modified differently for each of a plurality of specific additive manufacturing apparatus.

As mentioned above, the first geometrical compensation model may be derived from a training set made up of measurements taken from objects generated by a plurality of different additive manufacturing apparatus. In some examples, these additive manufacturing apparatus may be of the same class of additive manufacturing apparatus as one another, and the first additive manufacturing apparatus may comprise a specific example of the class of additive manufacturing apparatus.

By using an apparatus-specific geometrical compensation model, a greater degree of geometrical accuracy may be obtained. Moreover, by modifying existing geometrical compensation model data (for example, a model or a data set which maybe basis for deriving such a model), an improvement may be made based on a relatively small number of test/calibration objects. For example, the inventors have shown that a generic model may be improved in this way using measurements obtained from around 1-20 objects, with a number of measurements being acquired in each direction. In practice at least three measurements may be acquired for each object in each direction to infer a scale and an offset value for that object in that direction. If different adjustments are to be made to parameters relating to different object generation conditions, a larger number of objects may be generated to ensure any adjustments made to the existing geometrical compensation data are robust.

In an example, a 'full' calibration batch may comprise around 100-150 objects, each being an instance of one of around five different designs. The number of measurements of each object depends on the design, but may be in the range 10-30, giving around 2000 measurements for each calibration batch. However, if instead 40-60 objects were generated (for example in or near the 40% of locations for calibration objects associated with the highest variability) and around 800 measurements obtained, this could be used to adapt a compensation model and provide a noticeable improvement with respect to the dimensional accuracy in a subsequent build operation for the particular apparatus. Indeed, using the methods set out herein, the number of generated objects may be relatively low and an improvement may still be apparent.

In some examples, while the methods herein may reduce the number of calibration objects generated, there may be no reduction on the number of measurements for an object in a given position.

Block 316 comprises determining a second spatial arrangement of objects to be generated by the first additive manufacturing apparatus and block 318 comprises determining, for each object, a geometrical transformation to be applied thereto based on the geometrical compensation model generated in block 314 and the intended location of generation of that object. In this case, all of the objects may be 'production' objects rather than including calibration objects.

In this example, when an object is to be generated at a location between the locations of the set of locations, the method comprises interpolating a geometrical transformation based on the geometrical transformation values associated with at least two locations of the set of locations. In some examples, geometrical transformation values of the four closest locations may be interpolated to give an average, weighted by distance from each locating.

As noted above, it may be that not all the locations of the second subset of locations have new data associated therewith. In some examples, the generic data may be deleted, and objects generated at or near such locations may have transformations applied based on interpolation. One example in this regard is discussed in greater detail in relation to FIG. 4 below.

Block 320 comprises generating the objects of the second spatial arrangement, for example as described in relation to block 308 above.

By using a suitable compensation model—i.e. a compensation model which is tailored to a particular apparatus—to modify object model data, an object once formed may end up being closer to an intended size.

In some examples, the methods set out herein may be combined with other methods of object model modification. For example, a modification function may be employed in the vicinity, or locality, of small features. An erosion of such small features may result in an unacceptable reduction in their size, either obliterating the feature or rendering it too small to fuse or too delicate to survive cleaning operations. For example, if a feature has a dimension of around 0.5 mm, this may correspond to 12 voxels at 600 dpi. If three or four voxels are eroded from the side of such a small feature, it will lose approximately 50 to 60% of its cross-section, reducing its size to less than 0.3 mm. Such a feature may be too small to survive cleaning operations. Thus, in some examples, other functions may be used to ensure that small features are preserved.

Figure 4:
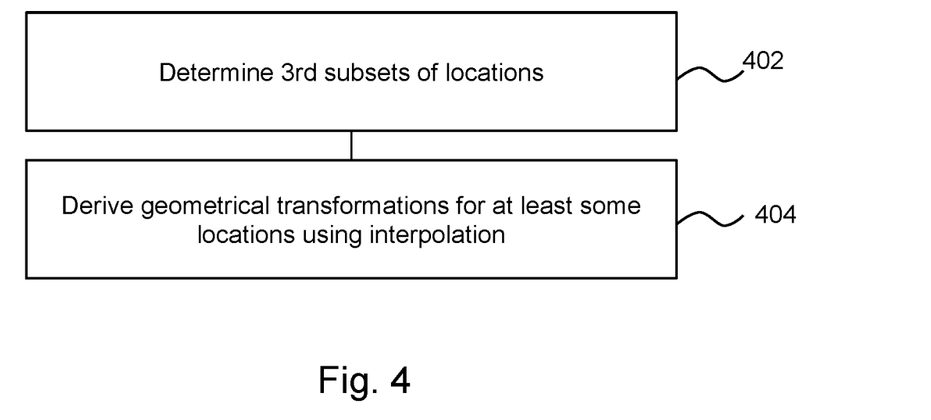

FIG. 4 is an example of a method in which a zone comprising a plurality of neighbouring locations are determined to have the second, higher, level of variability.

In this case, block 402 comprises determining, by at least one processor, a third subset of locations, wherein each location of the third subset of locations is a location of the second subset of locations and is adjacent to a location of the second subset of locations. In other words, the third subset of locations is selected from the second subset, with the qualifying feature being that at least one neighbour of each location is also in the second subset. Expressed another way, the locations of the third subset of locations represent clusters of two or more locations associated with relatively high variability in deviations from anticipated dimensions.

Block 404 comprises determining, by at least one processor, a geometrical transformation to be associated with at least one location of the third subset of locations based on interpolation of geometrical transformations for at least one location of the first subset of locations and data derived from an object generated by the first additive manufacturing apparatus. The interpolation may not be a linear interpolation and may be biased such that the effect of a value of a geometrical transformation which has been determined using objects generated by the first additive manufacturing apparatus degrades on a curve, for example according to an inverse square rule or the like, rather than in a linear fashion, for example using non-linear interpolation.

In particular, it may be that, for any one cluster of locations of the second subset, the number of locations in which a calibration object is generated may be less than the number in the cluster. As noted above, even in the case of a full calibration batch, the number of calibration objects may be less than the number of locations having predetermined transformations associated therewith, and the data for locations or nodes may be interpolated from measured data.

In some examples herein, a geometrical transformation to be associated with at least one location of the third subset of locations may be characterised based on at least one measured object generated by the first additive manufacturing apparatus from within the zone, and at least one 'generic' data point. In other words, the geometrical transformations for at least one location (and in some examples, all locations if the location of a calibration object does not match a location of a node) of a cluster may then be inferred, for example interpolated from surrounding locations, which may include the geometrical transformation characterised for a single location, or a few locations, in each cluster.

For example, the 'generic' data for a zones of high variability may be disregarded, and replaced with new data, which may comprise interpolated data based on at least one object generated using the first additive manufacturing apparatus. In some examples, at least one 'generic' data value may be replaced with a specific data value based on an object generated at a corresponding location. This may allow zones of high variability to be characterised using fewer calibration objects (reducing use of time and resources), while nevertheless tailoring the characterisation of the zone to the first additive manufacturing apparatus.

Figure 5:
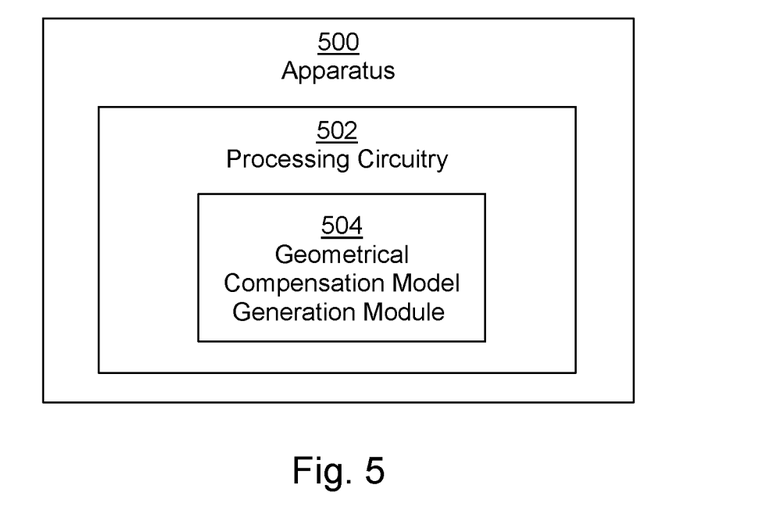
FIGS. 5 and 6 are simplified schematic drawings of example apparatus.

FIG. 5 shows an apparatus 500 comprising processing circuitry 502, the processing circuitry 502 comprising a geometrical compensation model generation module 504.

In use of the apparatus 500, the geometrical compensation model generation module 504 merges first geometrical compensation data and second geometrical compensation data to determine a geometrical compensation model for use in compensating for anticipated deformations in object generation by a first additive manufacturing apparatus. The derived geometrical transformation model may have any of the features of the geometrical compensation models discussed above, and may be intended to compensate for anticipated departures in dimensions from intended dimensions on object generation.

The first geometrical compensation data comprises geometrical compensation data associated with a first predetermined set of locations within a fabrication chamber and is derived based on indications of deviations between intended object dimensions and generated object dimensions of objects generated by a plurality of additive manufacturing apparatus. For example, this may comprise 'generic' compensation/deviation data as described above.

The second geometrical compensation data comprises geometrical compensation data associated with a second predetermined set of locations within a fabrication chamber and is derived based on indications of deviations between intended object dimensions and generated object dimensions of objects generated by the first additive manufacturing apparatus. For example, this may comprise 'specific' compensation/deviation data as described above.

The first geometrical compensation data comprises data associated with indications of deviations which have a variability between additive manufacturing apparatus which is below a threshold. The threshold may be applied to derived transformation parameters such as offset and/or scaling factors. In some examples, the second geometrical compensation data comprises data associated with indications of deviations which have a variability between additive manufacturing apparatus which is above the threshold, and/or at a higher level of variability that the first geometrical compensation data.

Figure 6:
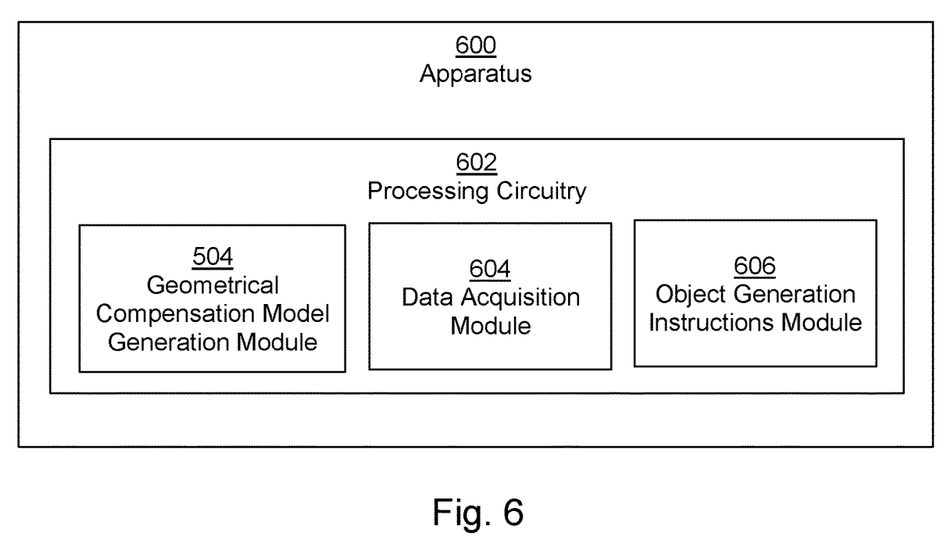

FIG. 6 shows an apparatus 600 comprising processing circuitry 602, the processing circuitry 602 comprising the geometrical compensation model generation module 504 as described in relation to FIG. 5 as well as a data acquisition module 604 and an object generation instructions module 606.

In use of the apparatus 600, the data acquisition module 604 acquires data indicative of deviations between intended object dimensions and generated object dimensions for objects generated by the first additive manufacturing apparatus to provide the second geometrical compensation data. For example, this may comprise a 3D scanner, or a data input terminal for receiving input measurements, and/or may determine the deviations from such measurements.

In use of the apparatus 600, the object generation instructions module 606 determines object generation instructions for generating at least one object, the object generation instructions specifying an amount of print agent to be applied to each of a plurality of locations on a layer of build material, and being determined based on object model data modified using the geometrical transformation model. For example, this may comprise determining a geometrical transformation for an object to be generated using additive manufacturing based on the geometrical transformation model and modifying the object model data using the geometrical transformation The object generation instructions (or print instructions), which may be derived by the object generation instructions module 606 may control the additive manufacturing apparatus 600 to generate each of the plurality of layers of the object. This may for example comprise specifying area coverage(s) for print agents such as fusing agents, colorants, detailing agents and the like. In some examples, such object generation parameters are associated with object model sub-volumes. In some examples, other parameters, such as any, or any combination of heating temperatures, build material choices, an intent of the print mode, and the like, may be specified. In some examples, halftoning may be applied to determine where to place fusing agent or the like. The object generation instructions may be specified in association with sub-volumes (e.g. voxels as described above). In some examples, the object generation instructions comprise a print agent amount associated with sub-volumes.

In some examples, the apparatus 600 may comprise additive manufacturing apparatus, which may generate an object based on the object generation instructions. For example, the apparatus 600, in use thereof, may generate the object in a plurality of layers (which may correspond to respective slices of an object model) according to object generation instructions. The apparatus 600 may for example generate an object in a layer-wise manner by selectively solidifying portions of layers of build material. The selective solidification may in some examples be achieved by selectively applying print agents, for example through use of 'inkjet' liquid distribution technologies, and applying energy, for example heat, to the layer. In other examples, heat may be selectively applied, and/or chemical agents such as curing or binding agents may be applied. The apparatus 600 may comprise additional components not shown herein, for example any or any combination of a fabrication chamber, a print bed, printhead(s) for distributing print agents, a build material distribution system for providing layers of build material, energy sources such as heat lamps and the like.

In some examples, object generation may comprise a fusing process, for example a thermal fusing process in which heat is applied.

The apparatus 500, 600 described in FIG. 5 or 6 may comprise a memory resource to store at least one geometrical compensation model. For example, this may comprise any or any combination of mapping resources, transformation vector(s), compensation parameter(s), algorithm(s) or the like, as have been described above. The geometrical compensation models may be intended to compensate for object deformation in additive manufacturing, wherein each geometrical compensation model may specify or determine a compensation transformation to apply based on predetermined criteria, which may differ between models. The geometrical compensation model(s) may have any of the features of the geometrical compensation models discussed above.

The processing circuitry 502, 602 or the modules thereof may carry out any of the blocks of FIG. 1, 3 or 4.

Figure 7:
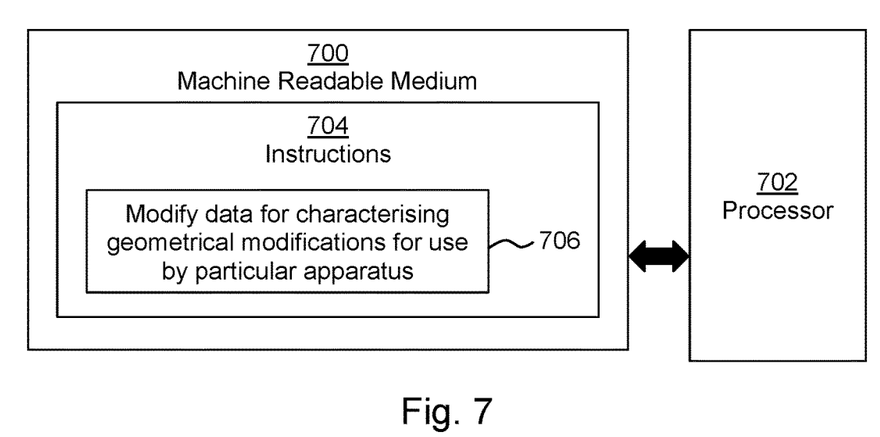
FIG. 7 is a simplified schematic drawing of an example machine-readable medium associated with a processor.

FIG. 7 shows a tangible machine-readable medium 700 associated with a processor 702. The machine-readable medium 700 comprises instructions 704 which, when executed by the processor 702, cause the processor 702 to carry out tasks. In this example, the instructions 704 comprise instructions 706 to cause the processor 702 to modify data for characterising geometrical modifications to compensate for anticipated dimensional deviations in object generation, wherein the geometrical modification is to vary based on location of generation and the data is derived based on measurements of dimensional deviation of objects generated by a plurality of additive manufacturing apparatus for use with a particular additive manufacturing apparatus. The modification comprises replacing at least one data value associated with a location of dimensional deviation variation above a threshold with a data value derived from measurements of dimensional deviation of objects generated by the particular apparatus. The instructions 706 may be instructions to generate a geometrical compensation model which comprises at least one scaling factor and/or at least one offset value associated with each of a plurality of predetermined locations. In some examples, each of the scaling factors and each of the offset values may be associated with one of three orthogonal axes. In some examples, the modification is based on dimensions of a plurality of test (or calibration) objects, which may be, or may be taken from, a predetermined set of calibration objects.

In some examples, the instructions 704 comprise instructions which, when executed, cause the processor 702 to cause an additive manufacturing apparatus to generate at least one calibration object at or near a location of dimensional deviation variation above a threshold.

In some examples, the instructions when executed cause the processor 702 to carry out any of the blocks of FIG. 1, 3 or 4. In some examples, the instructions may cause the processor 702 to act as any part of the processing circuitry 502, 602 of FIG. 5 or FIG. 6.

Examples in the present disclosure can be provided as methods, systems or machine-readable instructions, such as any combination of software, hardware, firmware or the like.

Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus (such as the geometrical compensation model generation module 504, the data acquisition module 604 and the object generation instructions module 606) may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving, by a processor, geometrical compensation model including geometrical transformations for a set of locations in a fabrication chamber for additive manufacturing, each location associated with a variability parameter derived from measurements of deformations of objects generated by a plurality of additive manufacturing apparatuses;
   setting, by the processor, a threshold defining first and second levels of variability in deformations in objection generation, wherein a first subset of locations are associated with the first level of variability, a second subset of locations are associated with the second level of variability, and the second level is greater than the first level;
   causing, by the processor, a particular additive manufacturing apparatus of the plurality of additive manufacturing apparatuses to generate calibration objects in at least some of the second subset of locations;
   acquiring, by the processor, indications of deviations between intended object dimension and generated object dimensions for the calibration objects generated by the particular additive manufacturing apparatus;
   deriving, by the processor, geometrical compensations to be associated with the second subset of locations based on the indications of deviations;
   replacing, by the processor, data for the second subset of locations in the geometrical compensation model with the derived transformations to generate a modified geometrical compensation model;
   determining, by the processor, a second spatial arrangement of objects to be generated by the particular additive manufacturing apparatus;
   determining, by the processor, a geometrical transformation to be applied to each object based on the modified geometrical compensation model; and
   causing, by the processor, the particular additive manufacturing apparatus to generate the objects in accordance with the geometrical transformation applied to each object.

2. The method according to claim 1, further comprising:
   determining, by the processor, the variability parameter for each location,
   wherein the variability parameter comprises a measure of standard deviation.

3. The method according to claim 1, further comprising:
   when an object is to be generated at a location between two locations of the set of locations, interpolating, by the processor, a particular geometrical transformation based on geometrical transformation values associated with at least the two locations.

4. A non-transitory machine-readable medium storing instructions executable by a processor to cause the processor to:
   modify data for characterizing geometrical modifications to compensate for anticipated dimensional deviations in object generation,
   wherein the geometrical modification is to vary based on location of generation and the data is derived based on measurements of dimensional deviation of objects generated by a plurality of additive manufacturing apparatus for use with a particular additive manufacturing apparatus, wherein the modification comprises replacing at least one data value associated with a location of dimensional deviation variation above a threshold with a data value derived from measurements of dimensional deviation of objects generated by the particular additive manufacturing apparatus; and cause the particular additive manufacturing apparatus to generate at least one object in or near the location of dimensional deviation variation above a threshold.

5. The machine-readable medium according to claim 4, wherein the instructions are executable by the processor to cause the processor to further:

modify the data to generate a geometrical compensation model comprising which at least one scaling factor and/or at least one offset value associated with each of a plurality of predetermined locations.

6. A computing device comprising:
a memory storing instructions; and
a processor configured to execute the instructions to:
    modify data for characterizing geometrical modifications to compensate for anticipated dimensional deviations in object generation,
    wherein the geometrical modification is to vary based on location of generation and the data is derived based on measurements of dimensional deviation of objects generated by a plurality of additive manufacturing apparatus for use with a particular additive manufacturing apparatus,
    wherein the modification comprises replacing at least one data value associated with a location of dimensional deviation variation above a threshold with a data value derived from measurements of dimensional deviation of objects generated by the particular additive manufacturing apparatus; and
    cause the particular additive manufacturing apparatus to generate at least one object in or near the location of dimensional deviation variation above a threshold.

7. The computing device according to claim 6, wherein the processor is configured to execute the instructions to further:

modify the data to generate a geometrical compensation model comprising which at least one scaling factor and/or at least one offset value associated with each of a plurality of predetermined locations.

* * * * *